United States Patent [19]
Walters et al.

[11] 3,755,962
[45] Sept. 4, 1973

[54] AERIAL PLANTING METHOD AND APPARATUS

[75] Inventors: John Walters, Whonnock; Ian S. Gartshore, Vancouver, both of British Columbia, Canada

[73] Assignee: Canadian Patents and Development Limited, Ottawa, Ontario, Canada

[22] Filed: July 28, 1971

[21] Appl. No.: 166,952

[30] Foreign Application Priority Data
Sept. 24, 1970 Canada .................................. 093968

[52] U.S. Cl. .............................. 47/34, 111/1, 102/2, 89/1.5 R, 244/136
[51] Int. Cl. ............................................. A01g 9/02
[58] Field of Search ................................... 111/1–3, 111/96, DIG. 1; 47/34, 37; 102/2; 89/1.5 R; 244/136

[56] References Cited
UNITED STATES PATENTS

| | | | |
|---|---|---|---|
| 2,306,321 | 12/1942 | Roberts | 111/1 UX |
| 2,528,986 | 11/1950 | Adams | 244/136 X |
| 3,273,284 | 9/1966 | Anagnostou | 47/34 |
| 3,517,629 | 6/1970 | Bridges et al. | 111/96 |

FOREIGN PATENTS OR APPLICATIONS
146,084  4/1948  Australia

*Primary Examiner*—Robert E. Bagwill
*Attorney*—James R. Hughes

[57] ABSTRACT

The invention provides a method of planting seeds or seedlings whereby planting containers containing the seedlings are dropped from an aircraft. The planting container has fins for aerodynamic stability, a pointed nose for penetrating the soil and wall portions penetratable by the roots of the seedlings.

3 Claims, 5 Drawing Figures

PATENTED SEP 4 1973

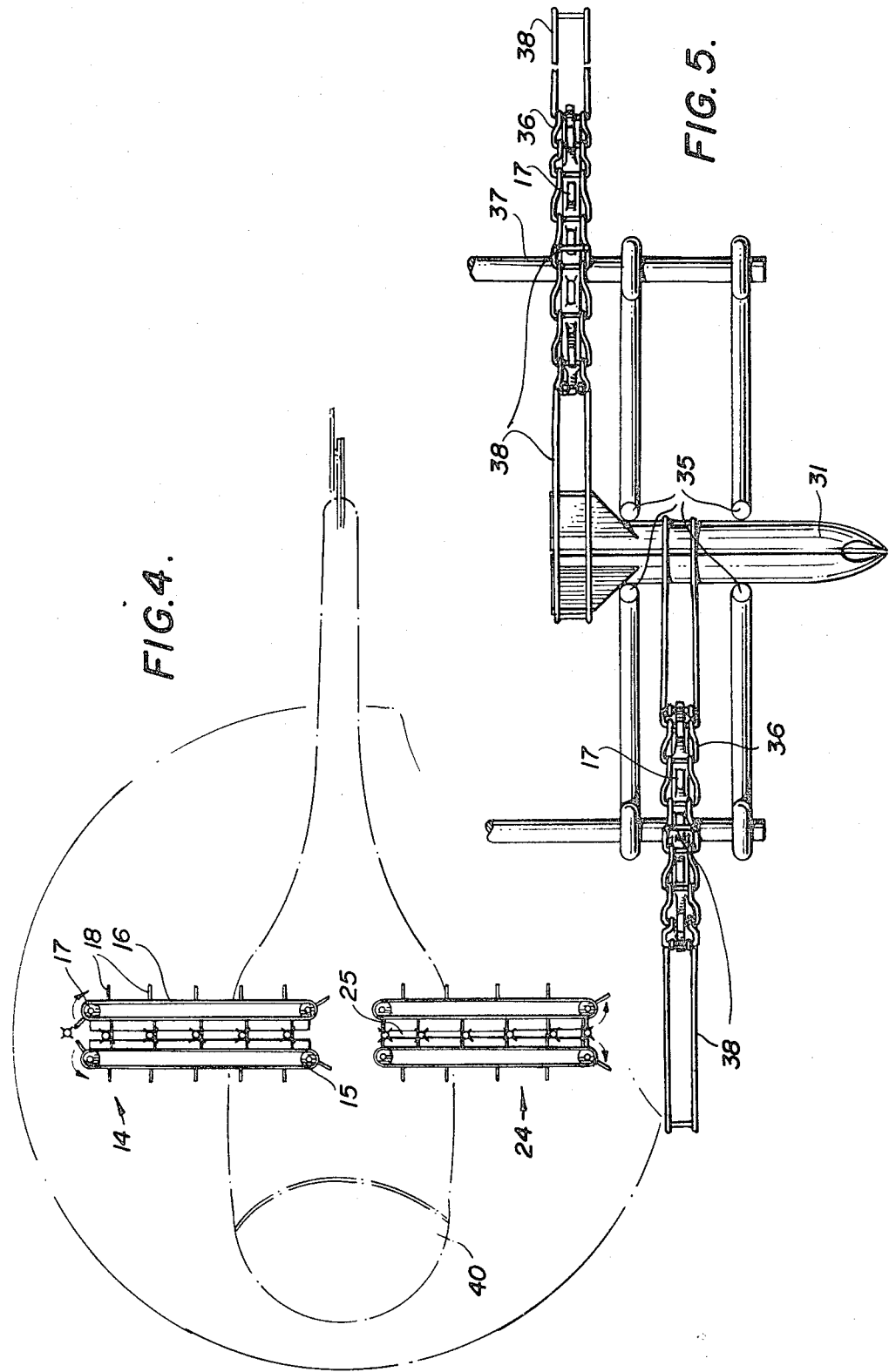

AERIAL PLANTING METHOD AND APPARATUS

This invention relates to a method and apparatus for the aerial planting of seedlings or growing seeds, and more particularly the planting of tree seedlings.

With present methods, seedlings are transported mechanically or manually on the ground to the plantation site, and are planted mechanically by modified agricultural planters or manually by grub hoes, spades or dibbles.

Canadian Pat. No. 694,803, by J. Walters issued Sept. 22, 1964, describes an apparatus wherein seedlings are placed in plastic bullet shaped containers and inserted mechanically into the soil by means of a planting gun.

Tree planting by conventional methods may be made difficult by the nature of the terrain making it difficult to reach the planting site and/or traversing the planting site for the planting operation.

These difficulties are alleviated by the present invention by performing the planting operation from an aircraft and thus eliminating the need to transport personnel and equipment directly to and on the planting site.

The invention provides a method of planting comprising of inserting seeds or seedlings and a growing medium in aerodynamically stable containers, having an earth penetrating nose, and dropping the containers from an aircraft into the planting site so as to penetrate the soil.

Preferably the containers are sequentially and uniformly released from said aircraft to provide uniform spacing of the seeds or seedlings.

According to one aspect of the invention the aerial planting apparatus comprises an aerodynamically stable container for receiving the seed or seedling, the container having a pointed earth penetrating nose and a side wall having portions thereof penetratable by the roots of the seedlings.

Preferably the container has an elliptical aperture that extends to the tip of the nose of the container.

The container may have a slot and/or a score line that extends substantially from the nose to the top of the container.

The container may be made aerodynamically stable by means of a plurality of fins attached to the upper portions of the side wall.

The container may include a number of additional apertures in the side wall to facilitate the passage of moisture to the roots.

FIG. 4 is a schematic top view of the container metering apparatus; and

FIG. 5 is an end view of the metering apparatus of the type shown in FIG. 4.

Figure 1:
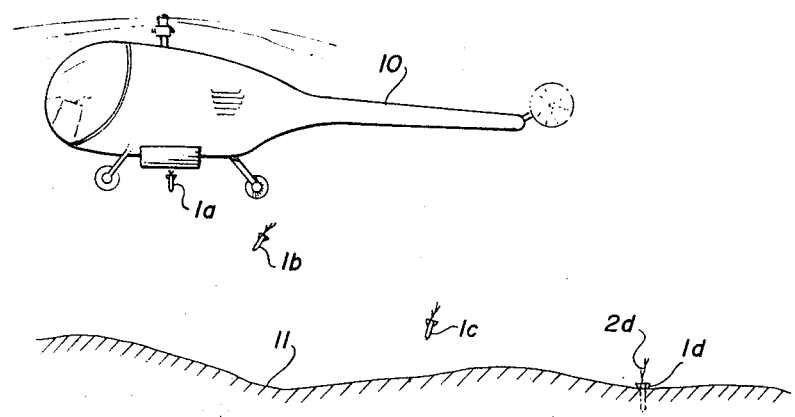
FIG. 1 is a pictorial view of the aerial planting operation.

Referring to FIG. 1, the aerial planting method comprises dropping of aerodynamically stable containers 1a, b; c, and d containing the seedlings 2a, b, c, and d respectively from an aircraft 10, whereby inertia of the container (1d) causes it to penetrate the soil and effect planting of the seedling (2d).

Figure 2:
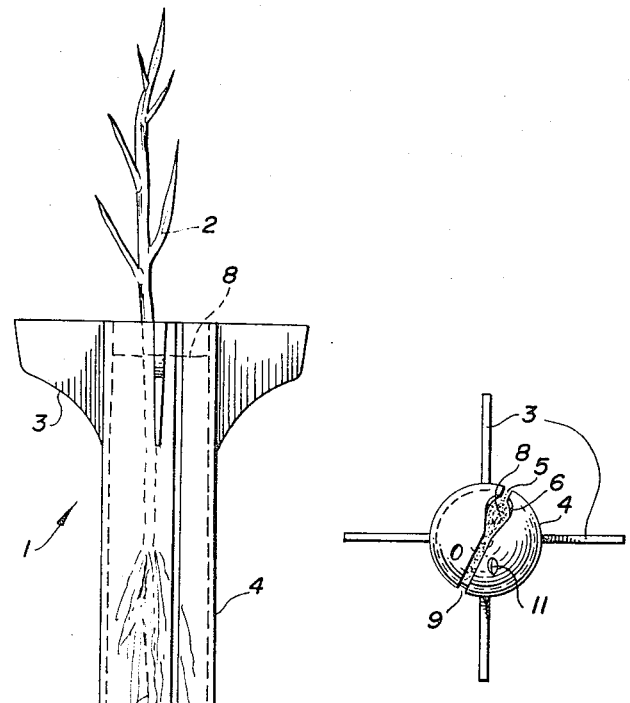
FIG. 2 is a side elevation of a planting container with seedlings.
Figure 3:
FIG. 3 is a bottom view of FIG. 2, showing the nose of the container.

FIGS. 2 and 3 show details of an embodiment of the aerial planting device.

The planting device comprises an aerodynamically stable container 1, containing the seedling 2, and stabalized by means of fins 3. The container 1 has an earth penetrating nose 7. The side walls 4 of the container 1 are made penetrable by the roots of the seedling by means of apertures 6 and 11, slot 5 and score line 9.

The aperture 6 allows the tap root 21 of the seedling to penetrate the container. Slots 5 and score line 9 allows the container to break-up as the roots develop. Additional apertures 11 facilitate the transfer of moisture to the roots.

The principal criterion in the design of the container is that it falls nose first penetrating the soil sufficiently to effect planting and that it allows the roots to penetrate the container and grow with a minimum of restriction from the walls.

Following is an example of a planting container found to be suitable:

Referring to FIGS. 2 and 3, the container made of a molded plastic is 4.5 inches long, has a diameter of 1 inch with a wall thickness of one-sixteenth inches. The container 1 has 4 equally spaced fins 3 each extending 1 inch along the wall portion 4 and 0.4 inches at the tip which projects 0.7 inches, transversely from the wall 4. Each fin 3 tapers longitudinally from its front end to the rear from a thickness of 0.025 inches to 0.060 inches. The aperture 6 is 0.5 inches long and 0.25 inches wide. The slot 5 and score line 9 extends from the aperture 6 to the top of the container.

For a container having the configuration of FIGS. 2 and 3, and having the dimensions of the aforesaid example, it was found that to obtain the desired stability the area of the four fins 3 should be at least 0.25 square inches, it should extend at least 0.5 inches longitudinally and project transversely 0.5 inches from the wall 4. The stability is improved with tapered fins as described in the aforesaid example.

In operation the seedling 2 is positioned in the container 1 with the roots extending in the direction of the nose 6, as in FIG. 2. The container is provided with a suitable growing medium 8.

Referring to FIG. 1, the containers 1 are released from the aircraft 10 over the planting site 11. Preferably the containers are mechanically metered from the aircraft to facilitate uniform spacing. Because of their aerodynamic design the containers will under the influence of gravity fall nose first and due to inertia will penetrate the soil to effectively plant the seedling.

Referring to FIG. 4, two metering devices 14 and 24 are mounted on the aircraft 40, with one on each side, so that two rows of seedlings can be planted simultaneously.

The containers are placed, manually or mechanically, in guideways 15 and 25. Each metering apparatus comprises a pair of endless chains 16, or the like, and sprockets 17 which are driven by suitable means (not shown). Each chain includes container engaging arms 18 which direct the containers along and beyond the guideways 15.

FIG. 5 shows some details of the metering device. The arms 38, secured to the chain 36 running on sprocket 17, direct the containers 31 along the guideways 35. The metering device may be attached to the aircraft by the shafts 37.

The rate of feed will be determined by the spacing of containers in the guideway and the speed of the chain. The length of the guideways may be made adjustable to provide different row spacing. With 3 inch spacing of the containers in the guideway, for example, chain speeds of 90 feet per minute would be required for planting of seedlings at 10 foot intervals from an aircraft flying at 60 feet per second.

The handling and metering of the containers may be facilitated by having them joined together in groups and detached just before being dropped.

The containers may be made of any rigid moldable material such as styrene or polyvinylchloride. The arrangement of apertures, slots, and score lines may be varied. However, it appears to be necessary that at least one aperture extends to the tip of the nose. An elliptically shaped aperture was found to be most suitable for this purpose.

It will be understood that the container may have any suitable number of fins or any shape that is aerodynamically stable.

What is claimed is:

1. An aerial planting container comprising:

a. elongated tubular side wall means which converge at the lower end thereof to define an earth penetrating nose;

b. an opening at the top end of said container to receive a seed or seedling and to allow growth thereof;

c. an eliptically shaped aperture defined by said wall in the region of the nose and which extends to the tip of the nose to allow egress of the tap root of the seedling and wherein the major axis of said aperture is oriented substantially from the tip of the nose to the top of the container;

d. a slot in the wall that extends from the aperture to the top of said container;

e. a score line that extends substantially from the nose to the top of said container, said score line being disposed substantially diametrically opposite to said slot; and f. aerodynamic stabilizing means associated with said container to ensure nose-first orientation of said container during flight.

2. The apparatus of claim 1 wherein said aerodynamic stabilizing means comprises a plurality of fins attached to the upper portions of the side wall.

3. The apparatus of claim 1 including additional apertures in the side wall means to facilitate the passage of moisture to the roots.

* * * * *